Feb. 26, 1957 G. A. AGOSTON 2,783,188
PROCESS OF FRACTIONATING ASPHALT AND
SIMILAR BITUMINOUS MATERIALS
Filed March 30, 1951 3 Sheets-Sheet 1

INVENTOR.
George A.
Agoston
By: Moore, Olson &
Trexler Attys.

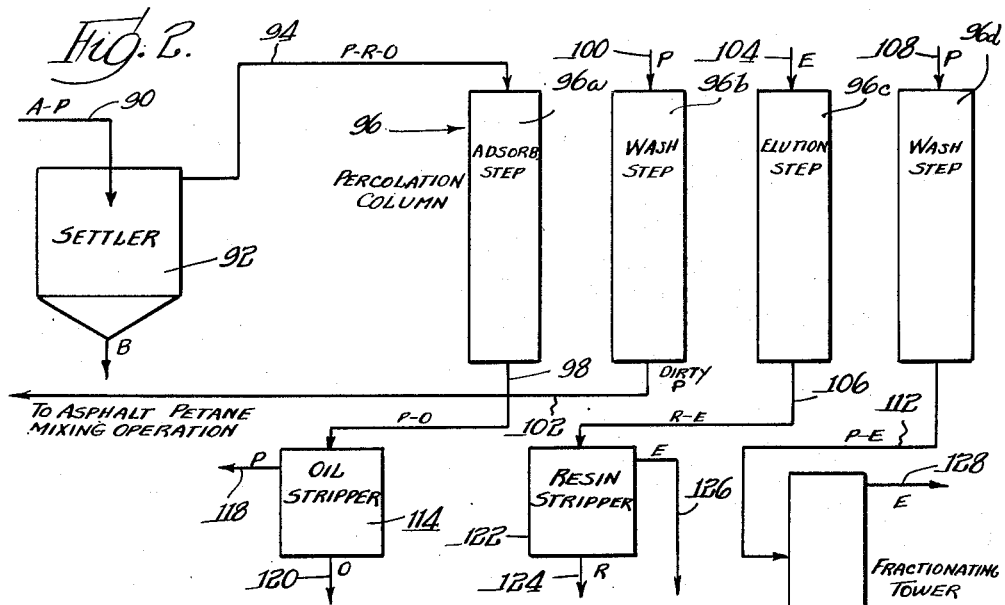
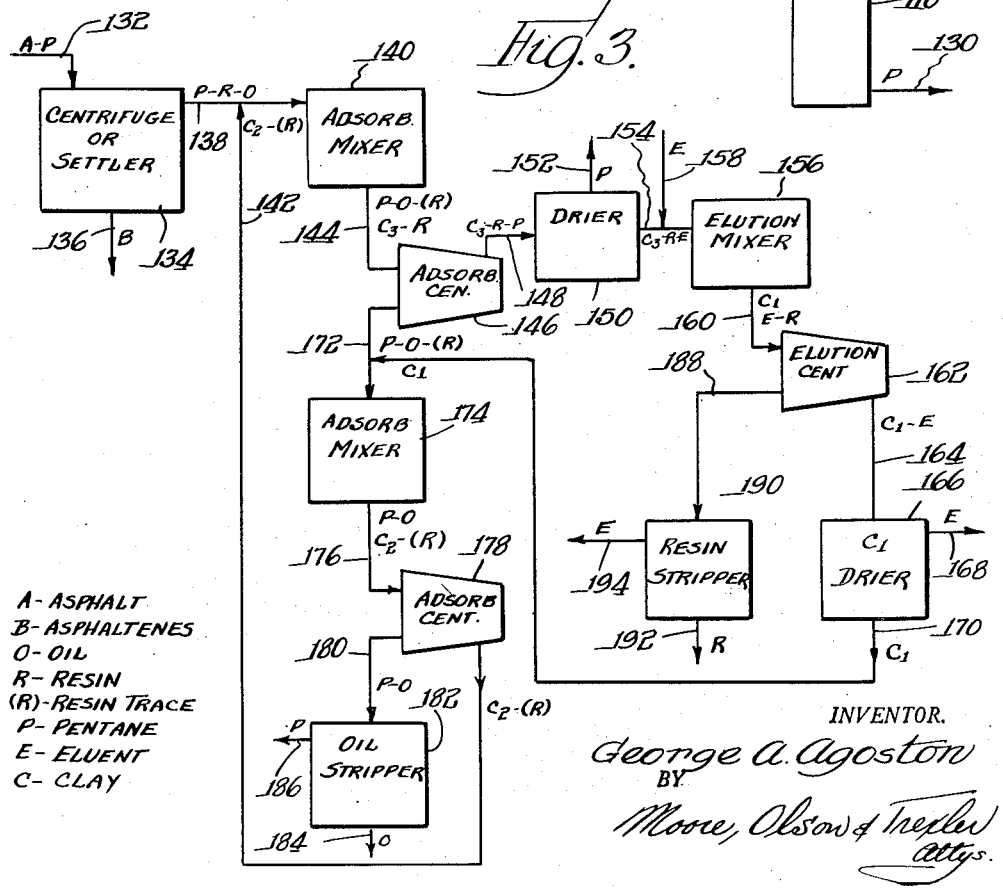
A- ASPHALT
B- ASPHALTENES
O- OIL
R- RESIN
(R)- RESIN TRACE
P- PENTANE
E- ELUENT
C- CLAY
INVENTOR.
George A. Agoston
BY
Moore, Olson & Trexler
attys.

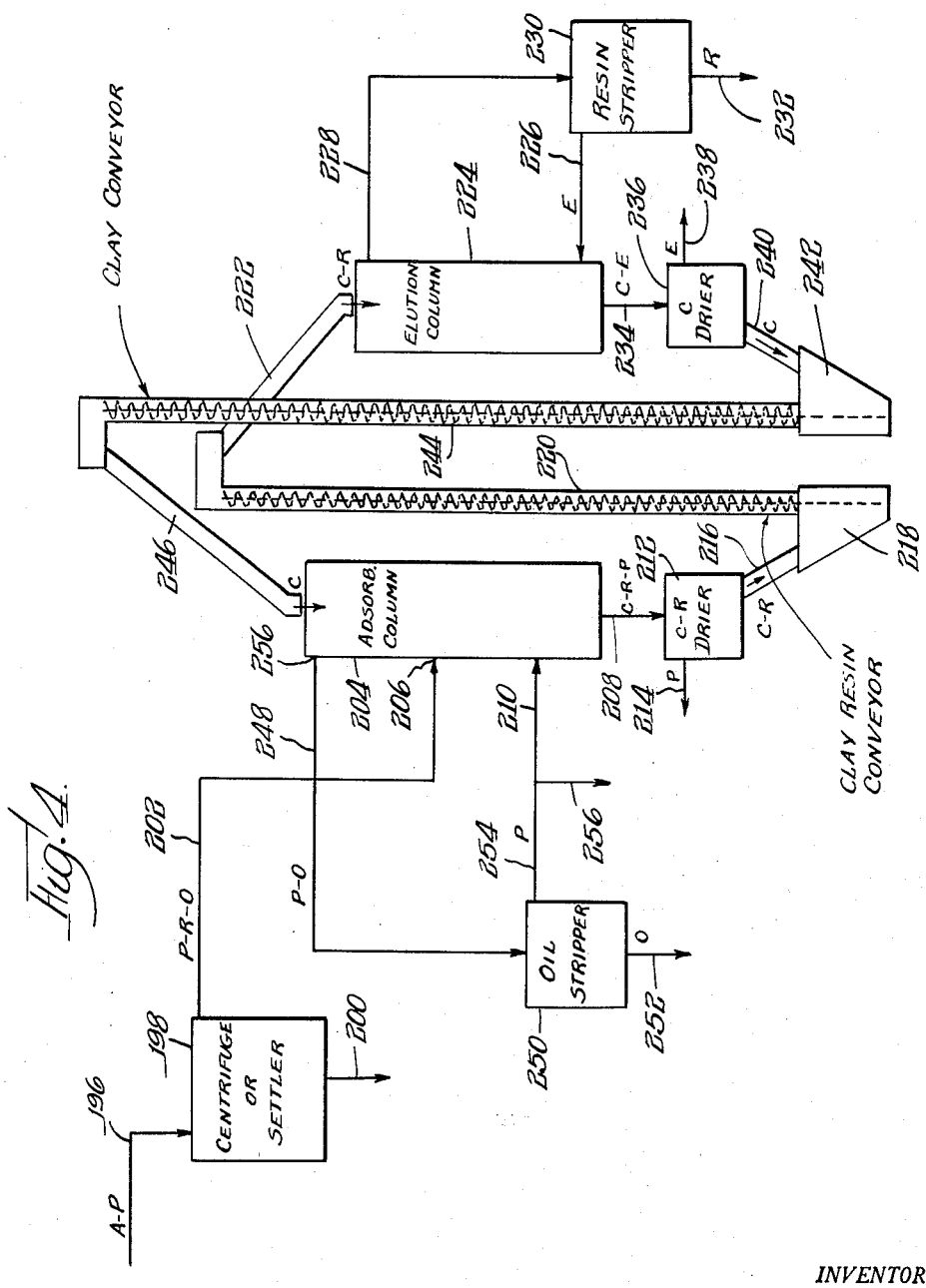

United States Patent Office 2,783,188
Patented Feb. 26, 1957

2,783,188

PROCESS OF FRACTIONATING ASPHALT AND SIMILAR BITUMINOUS MATERIALS

George A. Agoston, Oklahoma City, Okla., assignor to Kerr-McGee Oil Industries, Inc., a corporation of Delaware Application March 30, 1951, Serial No. 218,480

7 Claims. (Cl. 196—147)

This invention relates to a process for separating and recovering the constituents of asphalt and similar bituminous materials. More particularly, it relates to a process for separating asphalt and similar bituminous materials into at least two principal fractions or categories and recovering each of the fractions separately.

Since asphalt and similar bituminous materials are highly complex mixtures of a very large number of compounds covering a wide range of structures and molecular weights, it is customary to characterize their composition by solubility in definite amounts of arbitrarily selected solvents. Thus when, for example, an asphalt sample is thoroughly mixed with normal pentane, isopentane, normal hexane, petroleum ether, and certain other solvents, the undissolved portions settling out are classified ordinarily as asphaltenes and the soluble portion as a mixture of resinous and oily materials. Since the amount of material which settles out varies somewhat with these solvents, the undissolved portion is sometimes more specifically designated as "normal pentane asphaltenes," "isopentane asphaltenes," etc.

Certain writers and investigators (pp. 9, 15. "The Properties of Asphaltic Bitumen," Pfeiffer, J. P., Elsevier Publishing Co. Inc., New York, 1950) subdivide the above undissolved portion into smaller fractions with the use of other solvents. They restrict the term "asphaltenes" to that part of the undissolved material which is soluble in carbon tetrachloride and give the name "carbenes" to the portion insoluble in carbon tetrachloride but soluble in carbon disulfide and the name "carboids" to the remainder which is insoluble in carbon disulfide. Further or different subdivision is possible with other solvents and solvent mixtures. Furthermore, acidic components termed "acids" and "acid anhydrides" sometimes may be separated from asphalt and similar materials by special treatment.

As a rule the average molecular weight and structural complexity increases from the oily to the resinous fraction and finally to any undissolved fraction. Also these three fractions or categories may differ widely in their physical and chemical behavior. However, it is believed that there are individual members of each group which are border-line cases and which may fall into one fraction or category or another depending upon the treatment used, e. g. the kind and amount of solvent. Hence, it is to be understood that while an undissolved portion obtained by mixing bitumen with a large excess of solvent (for example, 100 volumes of solvent per volume of bitumen) may be somewhat greater in amount than that obtained with a smaller amount of solvent (for example, 10 volumes of solvent per volume of bitumen) in both cases the material which settles out is called herein the "undissolved portion" and the remainder is called a mixture of resinous and oily material. The mixture of resinous and oily material can be separated into two categories, which, in this specification are called "resins" and "oils," respectively.

Each of the two or more principal fractions or categories, namely, the resins and oils, as well as any other fractions which may be separated, is useful for purposes for which the parent material is not suitable or when used for the same purposes gives results which are new and useful. Thus, when the parent material is steam or vacuum reduced asphalt, the oils have lubricating properties, the resins are useful in coating compositions and as extenders in plastics manufacture and asphaltenes are useful as rubber extenders and in coating compositions. Also the resins, oils, and asphaltenes may be used singly or in combination as additives to modify the properties of asphalt and similar bituminous material. No practical method has heretofore been devised, however, for separating asphalt and similar bituminous materials into the above described principal fractions and recovering these fractions in useful form.

It is an object of this invention to provide a process for separating asphalt and similar bituminous materials into at least two principal fractions or categories, one of which is the oils and separately recovering each fraction.

A further object is to provide an economical process of separating asphalt and similar bituminous materials into at least two fractions or categories, one of which is the oils and separately recovering each fraction, in which process the solvents and adsorbents employed are also recovered for reuse.

A still further object is to provide an economical process of separating asphalt and similar bituminous materials into three principal fractions or categories, namely, an undissolved portion, resins and oils, and separately recovering each fraction, in which process the solvents and adsorbents employed are also recovered for reuse.

A still further object is to provide an economical process for continuously separating asphalt and similar bituminous materials into at least two principal fractions or categories, one of which is the oils and continuously separately recovering each fraction, in which process the solvents and adsorbents employed are also recovered for reuse.

Another object is to provide an economical process for continuously separating asphalt and similar bituminous materials into at least two principal fractions or categories, one of which is the oils and continuously separately recovering each fraction, in which process at least one fraction is separated with the aid of an adsorbent which circulates from a stage in which it adsorbs the fraction to a stage in which the fraction is separated from the adsorbent and back to the first named stage to adsorb additional quantities of the fraction and in which process the solvents are also recovered for reuse.

A further object is to provide an economical process of separating asphalt and similar bituminous materials into at least two principal fractions or categories, one of which is the oils, separately recovering each fraction and further separating oil fraction so recovered into subfractions.

Still another object is to provide an economical process of separating asphalt and similar bituminous materials into at least two principal fractions or categories, one of which is the oils and one of which includes the resins, separately recovering each fraction and further separating the fraction including the resins into sub-fractions.

Still another object of this invention is to provide apparatus for separating asphalt and similar bituminous materials into at least two principal fractions or categories, one of which is the oils, including means for mixing the bituminous material with a solvent, in which, at least, the oils and resins are soluble, means for adsorbing a fraction of the bituminous material on an adsorbent, means for separating from the solvent the fraction remaining therein after the adsorption step and means for separating the adsorbent and adsorbed fraction.

A still further object is to provide apparatus for continuously separating asphalt and similar bituminous materials into at least two principal fractions or categories, one of which is the oils, including means for continuously mixing the bituminous material with a solvent, in which, at least, the oils and resins are soluble, means for continuously adsorbing a fraction of the bituminous material on an adsorbent, means for continuously separating from the solvent the fraction remaining therein after the adsorption step and means for continuously separating the adsorbent and adsorbed fraction.

A still further object is to provide apparatus for separating asphalt and similar bituminous materials into at least two principal fractions or categories, one of which is the oils, including means for mixing the bituminous material with a solvent, in which, at least, the oils and resins are soluble, means for adsorbing a fraction of the bituminous material on an adsorbent, means for separating from the solvent the fraction remaining therein after the adsorption step, means for separating the adsorbent and adsorbed fraction and means for circulating the adsorbent from said means for adsorbing a fraction of the bituminous material to said means for separating the adsorbent and adsorbed fraction and back to said means for adsorbing.

Another object is to provide apparatus for continuously separating asphalt and similar bituminous materials into at least two principal fractions or categories, one of which is the oils, including means for continuously mixing the bituminous material with a solvent, in which, at least, the oils and resins are soluble, means for continuously adsorbing a fraction of the bituminous material on an adsorbent, means for continuously separating from the solvent the fraction remaining therein after the adsorption step, means for continuously separating the adsorbent and adsorbed fraction, and means for continuously circulating the adsorbent past said means for adsorbing a fraction of the bituminous material, thence to and past said means for separating the adsorbent and adsorbed fraction and back to said means for adsorbing.

Another object is to provide apparatus for separating asphalt and similar bituminous materials into three principal fractions or categories, including means for mixing the bituminous material with a solvent in which only the oils and resins are soluble, means for separating undissolved material and the solution so formed, means for adsorbing on an adsorbent a fraction of the bituminous material in said solution, means for separating from the solvent the fraction remaining therein after the adsorption step, means for separating the adsorbent and adsorbed fraction and means for circulating the adsorbent from said means for adsorbing a fraction of the bituminous material to said means for separating the adsorbent and adsorbed fraction and back to said means for adsorbing.

Still another object is to provide apparatus for continuously separating asphalt and similar bituminous materials into three principal fractions or categories, including means for continuously mixing the bituminous material with a solvent in which only the oils and resins are soluble, means for continuously separating the undissolved material and the solution so formed, means for continuously adsorbing on an adsorbent a fraction of the bituminous material in said solution, means for continuously separating from the solvent the fraction remaining therein after the adsorption step, means for continuously separating the adsorbent and adsorbed fraction and means for continuously circulating the adsorbent past said means for adsorbing a fraction of the bituminous material, thence to and past said means for separating the adsorbent and adsorbed fraction and back to said means for adsorbing.

Still another object is to provide improved apparatus for separating resins form a solution of a mixture comprising resins and oils of asphaltic or similar bituminous origin, including means for adsorbing resins from such a solution on an adsorbent, means for separating the adsorbent and adsorbed material and means for circulating the adsorbent from said means for adsorbing resins to said means for separating the adsorbent and adsorbed material and back to said means for adsorbing.

Still another object is to provide improved apparatus for continuously separating resins from a solution of a mixture comprising resins and oils of asphaltic or similar bituminous origin, including means for continuously adsorbing resins from such a solution on an adsorbent, means for continuously separating the adsorbent and adsorbed material and means for continuously circulating the adsorbent past said means for adsorbing resins, thence to and past said means for separating the adsorbent and adsorbing material and back to said means for adsorbing.

Other objects will appear hereinafter.

It has now been found that many of the foregoing objects are accomplished by mixing a solvent in which, at least, the oils and resins are soluble, with asphalt or similar bituminous material containing resins, oils and a fraction of higher average molecular weight and greater average molecular complexity than the corresponding averages of the resins, then, after separating undissolved material, if any remains, from the resulting solution including the oils and resins, contacting said solution with an adsorbent material, which adsorbs the resins in preference to the oils, to remove the resins from said solution and thereafter recovering the oils and recovering the adsorbed material separately by contacting the adsorbent with an eluting agent which removes the resins from the adsorbent and separating the resins and the eluting agent. The other objects are accomplished by the apparatus hereinafter described and illustrated in the accompanying drawings.

A fraction of higher average molecular weight and greater average molecular complexity than the corresponding averages of the resins may be separated initially from such bituminous material by mixing the bituminous material with a solvent which dissolves the oils and resins but does not dissolve such fraction. As explained more fully elsewhere herein the exact composition of such separated fraction or undissolved portion will vary with the solvent chosen and also with the ratio of the volume of the solvent to the volume of the bituminous material. In this specification the term "undissolved portion" is employed to describe any category or fraction of material which does not dissolve in the volume of solvent with which the original bituminous material is mixed. It is the portion which actually settles from the mixture under the force of gravity, or which is actually separated by other means for separating material which is not dissolved, such as centrifuging, filtration or the like. It is believed that the remainder is either in colloidal or in true solution or partly in colloidal solution and partly in true solution.

By way of relating various terms and descriptions employed, it is pointed out that in contrast to the term "undissolved portion," the description "fraction of higher average molecular weight and greater average molecular complexity" and the term "asphaltenes" may, but do not necessarily, refer to a fraction actually separated. Further illustrating, when the bituminous material is asphalt and a solvent such as normal pentane is employed in large excess the "undissolved portion" will be the material sometimes called "asphaltenes" or more specifically "normal pentane asphaltenes" and is also "a fraction of higher average molecular weight and greater average molecular complexity than the corresponding averages of the resins in the asphalt."

The process is applicable to a wide variety of asphalt and similar bituminous materials, containing resins, oils and a fraction of higher average molecular weight and greater average molecular complexity than the corresponding averages of the resins, including for example, steam or vacuum reduced residue, cracking residue, oxidized (air blown) asphalt, catalytically oxidized (air blown) asphalt, native (e. g. Trinidad) asphalt, asphaltites (e. g. gilsonite), crude oil containing asphalt, and reduced crude oil containing asphalt, as well as coal tars and pitches and tars and pitches obtained in the destructive distillation of peat, lignite, shales, wood and other organic matter.

Referring now more particularly to the first step in the process which involves mixing the asphalt and similar bituminous material with a solvent, it is pointed out that any desired solvent, as described above, may be employed in any desired amount, although as previously noted, the quantity of undissolved material obtained will depend upon both the nature and the volume of the solvent employed. For example, in the case of one particular vacuum reduced asphalt, it has been found that somewhat more undissolved material is obtained with normal pentane than with normal hexane and practically none is obtained with benzene.

Where the bituminous material is steam or vacuum reduced asphalt, and a substantial fraction of undissolved material is to be separated initially, preferred solvents include normal pentane, isopentane, petroleum ether, normal hexane, and mixtures of these solvents. With other bituminous materials, other solvents may be preferred and other solvents, such as benzene or cracked gasoline, are preferred even in the case of steam or vacuum reduced asphalt if it is not desired to separate a substantial undissolved portion initially.

In respect to the volume of the solvent, it is first pointed out that with steam or vacuum reduced asphalt, for example, a 10 to 1 volume ratio of normal pentane to asphalt has been found to give satisfactory results, although volume ratios either above or below this particular ratio may be employed. By way of further illustration, it has been found that about three volumes of benzene are sufficient to substantially completely dissolve steam or vacuum reduced asphalt, although it is generally preferable to employ about five volumes of benzene in order to be sure that an excess is present. On the basis of these illustrations, those skilled in the art can readily determine satisfactory volume ratios for the same or other solvents to the same or other bituminous materials. In this connection, it is pointed out that it has been found that with steam or vacuum reduced asphalt and normal pentane, reduction of volume below the 10 to 1 ratio, tends to prevent part of the highly complex and high molecular weight components of the asphalt from appearing in the undissolved portion, and on the other hand, increases in volume ratio above 10 to 1 tend to cause more of the highly complex and high molecular weight components to appear in the undissolved portion. Thus, if it is desired to insure that substantially all of the highly complex and high molecular weight components shall appear in the undissolved portion, it is preferable to employ ratios of solvent well in excess of 10 to 1. The use of such a large excess of solvent has also the advantage that it minimizes the amount of oil and resins remaining with the undissolved portion. Similar phenomena will be observed with other solvents and bituminous material combinations, although the volume ratio which gives satisfactory results may be higher or lower than 10 to 1.

In the case of the more highly viscous or solid bituminous materials, such as asphalt, it has been found preferable to heat the material to a more fluid state to facilitate mixing with the solvent and to obtain a more rapid and more complete dissolving of the oils and resins. Thorough mixing is also desirable and is aided by such heating of solid or viscous material. As a further aid to thorough mixing, the mixture of asphalt and solvent is preferably agitated in some manner. Mixing of the bituminous material and solvent may be carried out continuously, if desired, as more specifically described hereinafter, with or without continuous heating of the bituminous material.

When the solvent and asphalt or similar bituminous material have been thoroughly mixed, the mixture is ready for the separation of undissolved material, if any remains. Thus, the mixture may be allowed to stand until any undissolved material has settled, after which the supernatant solution may be drawn off. Similarly, the mixture may be fed to a continuous settling device which permits the continuous removal of undissolved material and the continuous withdrawal of the supernatant solution. Alternatively, the undissolved material may be separated from the solution by filtration. Still another method of carrying out a separation is to centrifuge the undissolved material from the mixture. Any other desired method may be employed which will effect the separation of the undissolved material from the solution of resins and oils.

Whatever method of separation is employed, the separated undissolved material, for example normal pentane asphaltenes is preferably dried to remove any traces of solvent, such as normal pentane, remaining therein. When the undissolved material is normal pentane asphaltenes it takes the form of a dark brown or black, friable material after this drying step.

The solution of resin and oil, after the separation of undissolved material, if any, is brought into contact with a suitable adsorbent material, such as fuller's earth or other adsorbent clay, preferably in granular or finely divided form. Any desired method of carrying out the contacting of the solution with the adsorbent material may be employed. For example, the adsorption may be carried out by passing the solution through a body of adsorbent material in granular form (e. g. by a percolation process) or alternatively, the solution may be mixed with powdered or granular adsorbent, after which the solution of oil and solvent is separated from the adsorbent containing the resin (e. g. by a contact process). The latter separation may be made by any desired method such as, for example, filtration. The adsorption may be carried out continuously or semi-continuously as well as by batch procedures as is more fully described and illustrated elsewhere in this specification. Preferably, after the adsorbent has been brought into contact with the solution of resin and oil, the adsorbent is washed with clean solvent in order to remove the remaining solution from the adsorbent.

It has been found that although the resins may be adsorbed by a suitable adsorbent, such as clay, from their solutions in solvents, such as those set forth above to be employed for separation of an undissolved portion or to dissolve substantially all the bitumen, the resins can, in turn, be removed from the adsorbent by other solvents called eluting agents or eluents. For example, in the case of vacuum reduced asphalt from which the normal pentane asphaltenes have been removed, such an eluting agent is a mixture of acetone and normal pentane containing preferably between about 10% and about 60%, by volume, of acetone. The mixture containing from about 40% to about 50% acetone is preferred from the standpoint of efficiency of resin removal but when the eluent becomes mixed with additional normal pentane in the process and is to be recovered only by fractionation, it is more convenient to employ a mixture containing 16.5%, by volume (20%, by weight) or less of acetone, since the mixture containing 16.5%, by volume, of acetone is a minimum boiling point mixture (at atmospheric pressure).

These normal pentane-acetone mixtures are preferred eluents but other eluents may be used if desired. After the adsorbent has been washed with the eluent by a contact process or by percolation or by contacting the eluent with a body of the adsorbent in some other manner, the eluent with the resin therein is separated from the adsorbent material. To insure removal of all but very slight traces of eluent from the adsorbent, the adsorbent material may be washed with a body of clean solvent, preferably, of the type present during the separation of the oils and resins. The adsorbent material is then ready for another resin adsorption cycle. Alternatively, instead of washing the adsorbent with the solvent, it may be treated in some other manner to remove the traces of eluent, such as, for example, by heating or by purging with hot gases. When the eluting operation is conducted by passing the eluent through a body of adsorbent material carrying the resin, the eluent is preferably passed through until it comes out substantially clear. Where other methods are employed, it is preferable to bring a quantity of the eluent into contact with the adsorbent carrying the resin which is sufficient to insure removal of all or nearly all the resin from the adsorbent. This elution step may also be applied to batches of material or carried out either continuously or semi-continuously, regardless of how other steps of the procedure are carried out. In continuous or semi-continuous operation, the adsorbent may be circulated continuously or semi-continuously through some or all of the steps in which it is involved.

Either or both of the solution of the resin in the eluent and of the oil in the initial solvent may be stored for later separation or they may be sent immediately to a separation operation by which the oil and solvent or resin and eluent are separated and each recovered continuously, semi-continuously or in batches. Known methods may be employed for carrying out the separations of both resins and eluting agent and solvent and oil. For example, the separation may be brought about by distillation procedure or by any other desired method. Ultimately, the resin or oil, after substantially all of the solvent or eluent has been removed, may be stripped of traces of solvent or eluent as the case may be by blowing with live steam or hot inert gas or by other suitable means. Thus, the solvent and eluent are recovered for reuse and the resins and oils are isolated in a form in which they can be stored or shipped.

In order that the invention may be better understood, reference is made to the accompanying drawings, which form a part of this specification and in which Figure 1 illustrates apparatus for carrying out the foregoing process by a batch method;

Figure 2 is a diagrammatic illustration of part of the apparatus shown in Figure 1;

Figure 3 illustrates diagrammatically apparatus for carrying out the process continuously; and Figure 4 illustrates diagrammatically another type of apparatus in which continuous fractionation of bituminous material may be accomplished in accordance with this invention.

In connection with the description of the apparatus shown in Figure 1, part of which is illustrated diagrammatically in Figure 2, a procedure for fractionating asphalt and similar bituminous materials in accordance with this invention will be described. The first step in this procedure involves mixing an asphalt such as vacuum reduced residue with normal pentane in the volume ratio of 1 to 10. This is accomplished in the portion of the apparatus appearing at the left hand side of Figure 1. The asphalt is introduced through the line 10 into an asphalt heater 12, the heat for which is supplied through steam coils 14. In the heater 12 the asphalt is heated sufficiently to melt it and is then pumped by an asphalt pump 16 through a mixing venturi 18 in molten form. At the same time normal pentane is pumped by a pump 20 from a pentane storage tank 22 to the mixing venturi 18 in which the pentane and asphalt are mixed. From the mixing venturi 18 the mixture of pentane and asphalt passes through a line 24, a separator 26, and a cooler 28 into either of two asphaltene settlers 30 and 32 which are employed alternately. It has been found to be preferable to pipe the pentane and asphalt mixture to the settling tank through cooling coil 34 in the cooler in order to maintain the system at a temperature below the boiling point of the pentane. Water supplied to the shell of cooler 28 serves as the cooling medium. In Figure 2 the line 90 corresponds to the line 24 through which the asphalt-pentane mixture ("A—P" in Figure 2) is introduced to the settlers 30 and 32, represented by one settler 92 in Figure 2.

When the desired quantity of pentane and asphalt in the above described ratio of 10 to 1 has been mixed and pumped into the settling tank 30 or 32 (92 in Figure 2) the charging of pentane and asphalt is discontinued. In order to achieve complete mixing, the pentane and asphalt mixture is circulated by the pump 16 from the tank 30 or 32 through the line 36 and from the pump 16 back into the tank from which it was drawn.

When the pentane and asphalt are thoroughly mixed so that the resins and heavy oils are dissolved and the insoluble asphaltenes left in suspension, the circulation of the mixture is discontinued and the asphaltenes are permitted to settle out in the tank 30 or 32 forming a cake on the bottom of the settling tank. During this period, the other of the two settling tanks may be charged with another batch of asphalt and pentane.

When the asphaltenes have settled to the bottom to form the cake, the supernatant solution of oil and resin and pentane is pumped out of the settler 30 or 32 through the line 38 by the pump 20 and directed through the line 40 into the percolation column 42. The line 38 as may be seen connects with swing joint suction pipes 44, 46 provided respectively in the settlers 30 and 32 to facilitate the pumping out of the supernatant liquid without disturbing the deposit of asphaltenes. After the solution of oil and resin in pentane is pumped out of the settler, the asphaltene cake is removed from the bottom of the settler and dried to remove pentane remaining therein, yielding the asphaltenes in the form of a dark brown or black, friable material. In Figure 2, the line 94 corresponds to lines 38 and 40 in Figure 1 and a percolation column 96 is shown which corresponds to column 42.

Referring now to the percolation tower 42 (or 96), it is pointed out that this tower is filled with a bed of 36–60 mesh fuller's earth, which previously had been heated to 600–800° F. The solution of resins and oils in pentane pumped into this tower as previously described through the line 40, percolates down through the fuller's earth and during this percolation the resins are adsorbed on the fuller's earth, allowing the oil and pentane to pass on through the tower and through the line 48 and the line 50 to a pentane oil storage tank 52. The line 50 is provided with a sight glass 54 and a flowmeter 56 so that flow through the line can be readily observed. In Figure 2 the percolation column 96 is shown four times, designated 96a, 96b, 96c and 96d, to better illustrate the four steps carried out therein. The first step, described above, is 96a. Line 98 corresponds to lines 48 and 50 but, for simplicity, a storage tank corresponding to tank 52 is omitted in Figure 2. The capacities of the settlers are designed to be such that the quantity of resin and oil solution obtained from each batch of asphalt treated therein will not contain a quantity of resin in excess of the resin adsorbing capacity of the clay in the tower 42, or alternatively, the solution of resin and oil in pentane can be sent from the settlers to a storage tank (not shown) and stored before passing it to tower 42. By limiting the amount of pentane-resin-oil solution supplied to tower 42 in one cycle, any discharge of resins from the tower 42 may be avoided. Instead of limiting the amount of solution sent through tower 42 in one cycle, the charging of the solution may be continued until the solution coming out of the tower begins to contain resins after which the charging can be stopped and the remainder of the solution coming out of the tower can be stored, for example, in the pentane-resin-oil storage tank, for recharge to the next cycle.

After the solution of pentane and oil has all discharged from the tower 42, clean pentane is pumped into this tower from the tank 22 by the pump 20 to wash out the remaining solution from the clay. This material, called "dirty pentane," is sent to a dirty pentane storage tank 58. It is used in a subsequent cycle as part of the pentane to be mixed with the asphalt in the mixing venturi 18. This step of washing with clean pentane is designated 96b in Figure 2. Clean pentane is shown entering at 100. Line 102 and the accompanying legends indicate in simplified form that the "dirty pentane" eventually ends up in the asphalt mixing operation.

In order to recover the resins from the adsorbent, a material called an eluent, which, as described, is capable of removing the adsorbed resin from the adsorbent and dissolving it, is passed through the body of adsorbent in the tower. A preferred eluent is a mixture of 20% by volume of acetone with 80% by volume of pentane. This eluent has particular advantage in that it is a constant boiling mixture so that when the pentane-acetone-resin mixture is distilled, the distillate contains pentane and acetone in the proper proportions and can be sent directly to pentane and acetone storage for reuse.

Preferably, the pentane-acetone eluent, pumped from the pentane-acetone storage tank 60 with the aid of the pump 20 flows downward through the tower 42. The pumping of the eluent is continued until the eluent comes out of the tower 42 clear. The resin-pentane-acetone mixture coming out of the tower 42 passes through the line 48 and through the line 50 to a resin-pentane-acetone storage tank 62. This is step 96c in Figure 2, in which eluent is shown entering column 96 at 104 and resin-pentane-acetone mixture is shown coming out through line 106. A storage tank such as 62 is not shown.

When the eluent comes out of the tower 42 clear or nearly clear, the pumping of the eluent is stopped and a quantity of clean pentane is passed through the clay to purge the clay of acetone (step 96d in Figure 2 in which pentane enters at 108). This washing solution may be passed to the rectifier 64 to separate pentane and eluent and recover them for reuse. Following this washing step, the percolation tower 42 is ready for another resin adsorption cycle. In Figure 2, fractionating tower 110 corresponds to rectifier 64 and pentane and eluent are shown passing to tower 110 through line 112.

The solvent, oil and resin recovery system involves stripping pentane from the oil to recover the pentane and oil, and stripping pentane and acetone from the resins to recover the resins and the pentane and acetone. The pentane and oil solution from the tank 52 is pumped by a pump 65 to an oil stripper 66, which in turn, delivers the pentane through an entrainment separator 68 and a line 70 to a condenser 72 and from the condenser 72 into the pentane storage tank 22. The oil remaining in the oil stripper 66 may be completely stripped of traces of pentane by blowing with live steam or natural gas, after which it is drained from the stripper 66 into drums for product storage. In the simplified diagram of Figure 2 pentane-oil solution is directed in line 98 to oil stripper 114 which corresponds to stripper 66 and pentane and oil are shown leaving stripper 114 at 118 and 120, respectively.

The resin-pentane-acetone mixture is pumped from the storage tank 62 into the resin stripper 74 with the aid of the pump 76. From the resin stripper 74, the vaporized eluent passes overhead through an entrainment separator 78 and line 80 to a condenser 82 from which the condensed liquid passes into the eluent storage tank 60. The last traces of solvent may be removed from the resin in the resin stripper 74 by blowing with live steam or natural gas, after which the molten resins are drained from the stripper 74 into an open drum. In Figure 2 the resin-eluent mixture is directed by line 106 to resin stripper 122. Resin and eluent are shown leaving stripper 122 at 124 and 126, respectively.

Referring back to the rectifier 64, it is pointed out that the eluent mixture is taken off overhead and the pentane remaining is drained off the bottom of the rectifier 64 through a cooling box 84 and pumped by pump 86 to pentane storage tank 22. The rectifier 64 is provided with a liquid level control 88 for the pump 86. In the simplified showing of Figure 2, eluent is shown leaving tower 110 overhead at 128 and pentane is drawn off the bottom at 130.

Figure 3 illustrates diagrammatically apparatus by means of which continuous or semi-continuous separation of bituminous material into three fractions as described above may be carried out. The equipment for forming a mixture of bituminous material and solvent, for example, asphalt and normal pentane, illustrated in Figure 1, is used as a part of the apparatus illustrated in Figure 3 but is not shown. An asphalt-pentane mixture such as that supplied to the settlers 30 and 32 as described above, is shown entering in Figure 3 passing through a line 132 into a centrifuge or settler 134 from which asphaltenes are drawn off through a line 136. In the apparatus of Figure 3, the unit 134 may be either a contrifuge or settler as described. From the centrifuge or settler 134, pentane-resin-oil solution is directed through line 138 into an adsorbent mixer 140 which may be of any desired type. In this adsorbent mixer, the pentane-resin-oil solution is mixed with an adsorbent such as fuller's earth, as described above, which as will appear more fully, is supplied through line 142. As may be seen by referring to the drawing, this clay adsorbent is designated by the letter C with the sub-script 2, the meaning of which will become clear hereinafter. After the adsorbent and solution are thoroughly mixed in the mixer 140, the mixture passes through line 144 into a centrifuge 146, in which the clay with the resin adsorbed on it is separated from the solution and passed through line 148 into a dryer 150. In the dryer 150, the small amount of pentane carried with the clay and resin through the line 148 is driven off through line 152 and the dry clay passes through line 154 to the elution mixer 156.

Pentane-acetone-eluent as described above is supplied through line 158 and mixed with the dry clay in the elution mixer 156. After the clay and resin have been thoroughly mixed with the eluent in mixer 156, the eluent will have removed the resin from the clay and dissolved it and the resulting mixture passes through line 160 into centrifuge 162 in which the clay is separated from the resin-eluent mixture. The separated clay carrying a small amount of eluent with it passes through line 164 into dryer 166 and the remaining eluent is driven off through line 168. The dry clay then passes through line 170 back to a line 172 through which the pentane-oil solution, separated in centrifuge 146 and containing a trace of resin, passes into an adsorbent mixer 174.

In the mixer 174, the pentane-oil solution with the trace of resin and the clay, passing through line 170 and line 172, are thoroughly mixed, as in mixer 140, and then pass through a line 176 to another centrifuge 178. In this centrifuge, the clay, which has now picked up the trace of resin in the pentane-oil mixture passing through line 172, is separated from the pentane-oil solution and is the clay which is designated C2 and which passes through line 142 and is mixed in mixer 140 with the original pentane-resin-oil solution. The pentane-oil solution separated in centrifuge 178 passes through a line 180 into an oil stripper 182 in which oil and pentane are separated and leave respectively through lines 184 and 186. Referring back to the elution centrifuge 162, it is pointed out that the eluent-resin mixture separated in this centrifuge is passed through line 188 into a resin stripper 190 in which the resin and eluent are separated and leave respectively through lines 192 and 194.

The foregoing description will aid in understanding the significance of the sub-script numerals in Figure 3. Thus, the numeral 1 indicates clay which has no resin thereon, numeral 2 indicates clay which has been exposed to a pentane-oil solution from which all but a trace of resin has been removed in a preceding adsorption step so that the clay C2 has a trace of resin thereon. The sub-script 3 indicates clay which has a comparatively large amount of resin adsorbed thereon, this clay having been through the C2 stage and then exposed to fresh pentane-resin-oil solution.

The showing of the apparatus illustrated in Figure 4 is abbreviated in the same manner as that shown in Figure 3, that is, the equipment for forming the asphalt-pentane mixture is not illustrated. Asphalt-pentane mixture is supplied through a line 196 to a centrifuge or settler 198 which may and preferably does operate continuously to separate an undissolved portion from the pentane-resin-oil solution, the undissolved portion being drawn off through the line 200 and the pentane-oil-resin solution passing through a line 202 to an adsorption column 204. The adsorption column 204 contains a body of finely divided clay or other suitable adsorbent which moves continuously downwardly through this column adsorbing resin from the pentane-resin-oil solution above a level determined by the level 206 at which this solution is supplied to the column and then being washed with pentane which is supplied below this point and which flows upwardly in the same direction as the pentane-resin-oil solution and counter-current to the clay. In this connection, it is emphasized that while the apparatus of Figure 4 is described in connection with the processing of an asphalt-pentane mixture, it is applicable to other combinations of bituminous material and solvent also and the asphalt-pentane mixture is mentioned specifically only for illustration.

The clay or other adsorbent with the resin adsorbed thereon passes continuously out of the bottom of column 204 at 208 along with a relatively small part of the pentane wash supplied to the column through the line 210. The clay and resin adsorbed thereon pass out through a suitable trap (not shown), which prevents downward flow of liquid but permits passage of clay, and through the line 208 continuously entering the dryer 212 in which the small amount of pentane carried by the clay is driven off through a line 214 from which it can be directed to a condenser and then to storage or to any other desired point. The dried clay with the resin thereon leaves the dryer through a line 216 which directs it into a trough 218 from which it is conveyed upwardly by a conveyor such as the screw conveyor 220. From the top of the screw conveyor 220, the clay is directed through a line 222 to the top of elution column 224, through which the clay flows continuously downwardly. In column 224, eluent solution, such as the pentane-acetone mixture described above, entering through line 226 flows upwardly counter-current to the clay and removes from the clay or other adsorbent the resin carried thereon and dissolves it. The eluent-resin mixture passes out of the elution column through the line 228 through which it is directed to a resin stripper 230 in which the eluent is stripped (continuously, if desired) from the resin and directed on in the cycle through the line 226. The resin, free of eluent, is directed out of the resin stripper through the line 232.

The clay moving down column 224 is finally substantially free of resin and passes out through a suitable trap (not shown), which prevents downward flow of liquid but permits passage of clay, and through line 234 carrying a small amount of eluent with it and enters a dryer 236, in which this small amount of eluent is removed and directed out through line 238, through which it can be sent to a condenser and then to storage or to any other desired point. From the dryer 236 dry clay is directed by line 240 into another trough 242 from which it is elevated by a conveyor such as the screw conveyor 244 and directed through a line 246 back to the adsorption column 204 to adsorb fresh quantity of resin.

A suitable trap (not shown) is provided at the bottom of the adsorption column to cause the pentane-resin-oil solution and the wash pentane to flow upwardly in the adsorption column counter-current to the clay flowing downwardly therein and the pentane-oil solution from which the resin has been adsorbed in the column along with pentane originating as wash pentane is taken off through the line 248 and directed to oil stripper 250 in which the pentane and oil are separated, the oil passing out through the line 252 and the pentane through the line 254. From line 254 the pentane goes to a condenser (not shown) and a portion of the pentane is directed to the line 210 and the remainder drawn off through the line 256 to storage or any other desired point.

It will be apparent that as the pentane-resin-oil solution moves upwardly in the column 204, its resin content is continuously decreased and it is, therefore possible to draw off fractions of differing composition depending upon the level at which the fraction leaves the column. Furthermore, two or more such fractions of differing composition may be drawn off continuously and simultaneously by locating outlets at two or more levels above the level 206.

It will be apparent that the portion of the apparatus for handling the adsorption and the elution, as shown in Figure 4, provides continuous circulation of the clay or other adsorbent and thus permits continuous adsorption and continuous elution. By supplying asphalt-pentane or some other mixture continuously to a centrifuge, such as the centrifuge 198, a continuous supply of the pentane-resin-oil mixture is provided to circulate continuously through the column 204, thus making a fully continuous operation.

In this specification, reference is made at several points to a particular vacuum reduced asphalt. This particular vacuum reduced asphalt was obtained from Oklahoma asphalt base crude oil, and tested by A. S. T. M. methods, was found to have a penetration of 92 at 77° F., a ring and ball softening point of 113° F. and a ductility of 150+ cm. at 77° F.

Many of the advantages of the invention will be apparent from the foregoing description. There is provided for the first time an effective method of separating asphalt and similar bituminous materials into at least two fractions, one of which is the oils and also into three fractions, consisting of resins, oils and an undissolved portion. In accordance with the process, all of the starting asphalt or bituminous material is recovered in the separated fractions. Similarly, the solvents employed, as well as the adsorbent, are also recovered for reuse. In addition, apparatus is provided by means of which the process may be carried out very effectively and efficiently. The apparatus provided includes equipment for carrying out the procedure either in batch form or continuously. It provides, among other things, apparatus in which the adsorbent is continuously circulated giving highly efficient operation. The advantages of the novel clay circulating system for separating resins from a mixture of oils and resins in the solvent are indicated in the above description.

It is apparent that many widely different embodiments of this invention may be made without departing from the spirit and scope thereof and therefore it is not intended to be limited except as indicated in the appended claims:

The invention is hereby claimed as follows:

1. The process of fractionating asphalt and similar bituminous material containing resins, oils, and a fraction of higher average molecular weight and greater average molecular complexity than the corresponding averages of the resins, which comprises mixing such material with a solvent containing substantially hydrocarbons selected from the group consisting of n-pentane, isopentane and hexane, then separating the undissolved material from the resulting solution including the oils and resins, contacting said solution with an adsorbent material which adsorbs the resins in preference to the oils to remove the resins from said solution, and thereafter recovering the oils and recovering the adsorbed material separately by contacting the adsorbent with an eluting agent comprising a mixture of acetone and pentane, and said adsorbent material being continuously subjected alternately to the process of adsorbtion thereon of resin from the resulting solution and then the removal of the resins therefrom by elution.

2. The process of claim 1 wherein the ratio of acetone to pentane in the eluting agent is 2 to 3.

3. The process of claim 1 wherein the absorbent material is selected from the class of absorbent material consisting of fuller's earth and clay.

4. The process of fractionating asphalt and similar bituminous material containing resins, oils, and a fraction of higher average molecular weight and greater average molecular complexity than the corresponding averages of the resins, which comprises mixing such materials with a solvent containing substantially hydrocarbons selected from the group consisting of n-pentane, isopentane and hexane, then separating the undissolved material from the resulting solution containing oils and resins, contacting said solution with an adsorbent material which adsorbs the resins in preference to the oils to remove the resins from said solution, thereafter recovering the oils from said solution and recovering the adsorbed material separately by contacting the adsorbent with an eluting agent comprising a mixture of acetone and pentane, said adsorbent being continuously circulated through an enclosure in which said adsorption is carried out, thence to and through an enclosure in which the elution step is carried out and back to said first named enclosure.

5. The process of claim 4 wherein the ratio of acetone to pentane in the eluting agent is 2 to 3.

6. The process of fractionating asphalt containing resins, oils, and a fraction of higher average molecular weight and greater average molecular complexity than the corresponding averages of the resins, which comprises mixing such material with a solvent containing substantially hydrocarbons selected from the group consisting of normal pentane, isopentane and hexane then separating the undissolved material from the resulting solution including the oils and resins, contacting said solution with an adsorbent clay which adsorbs the resins in preference to the oils to remove the resins from said solution, and thereafter recovering the oils and recovering adsorbed material separately by contacting the adsorbent clay with a pentane-acetone eluent to remove the resins from the adsorbent clay and said clay being continuously circulated through an enclosure in which said adsorption is carried out, thence to and through an enclosure in which said elution step is carried out and back to said first named enclosure.

7. The process of fractionating asphalt containing resins, oils, and a fraction of higher average molecular weight and greater average molecular complexity than the corresponding averages of the resins, which comprises thoroughly mixing such asphalt with a volume of solvent selected from the group consisting of normal pentane, isopentane, and hexane in which the oils and resins dissolve and said fraction of higher molecular weight is not dissolved, then separating the undissolved material from the resulting solution including the oils and resins, then contacting said solution with fuller's earth to adsorb the resins in preference to the oils and to remove the resins from said solution, and thereafter separating the fuller's earth and the solution of oils and recovering the oils by separating them from the solvent in which they are dissolved, and recovering adsorbed material separately by contacting the fuller's earth with a pentane-acetone eluent to remove the resins from the adsorbent and separating the mixture of resins and eluent from the fuller's earth and separating the resins from the eluent and said adsorbent being continuously circulated through an enclosure in which said adsorption is carried out, thence to and through an enclosure in which said elution step is carried out and to said first named enclosure.

References Cited in the file of this patent
UNITED STATES PATENTS

| | | |
|---|---|---|
| 1,997,896 | Baylis | Apr. 16, 1935 |
| 2,106,071 | Stanton | Jan. 18, 1938 |
| 2,131,205 | Wells et al. | Sept. 27, 1938 |
| 2,143,882 | Keith et al. | Jan. 17, 1939 |
| 2,145,784 | Anderson et al. | Jan. 31, 1939 |
| 2,191,091 | Bray et al. | Feb. 20, 1940 |
| 2,255,283 | Forrest | Sept. 9, 1941 |
| 2,337,448 | Carr | Dec. 21, 1943 |
| 2,487,794 | Evans | Nov. 15, 1949 |
| 2,560,448 | Jones | July 10, 1951 |
| 2,564,717 | Olson | Aug. 21, 1951 |
| 2,571,380 | Penick | Oct. 16, 1951 |